United States Patent [19]

Cilindro

[11] Patent Number: 4,518,288
[45] Date of Patent: May 21, 1985

[54] MACHINABLE WAX FOR PROTOTYPE PATTERNS

[75] Inventor: Leticia D. Cilindro, Strongsville, Ohio

[73] Assignee: Loreto Turco, Avon Lake, Ohio

[21] Appl. No.: 391,554

[22] Filed: Jun. 24, 1982

[51] Int. Cl.³ .............................................. B23Q 3/02
[52] U.S. Cl. .................................... 409/219; 106/38.8; 164/45; 269/47; 409/130
[58] Field of Search .............. 29/26 R, DIG. 26, 402, 29/15; 409/132, 131, 219, 93, 85, 225, 79, 133, 130; 164/45, 235, 239, 243, 249, 244; 156/155, 154; 264/263; 269/47, 101, 174; 524/479; 106/38.8

[56] References Cited

U.S. PATENT DOCUMENTS

| | | | |
|---|---|---|---|
| 2,454,777 | 11/1948 | Cronan | 51/283 |
| 3,140,268 | 7/1964 | Halpern et al. | 260/23 |
| 3,263,286 | 8/1966 | Watts et al. | 22/164 |
| 3,461,749 | 8/1969 | Gagne | 76/107 |
| 3,550,673 | 12/1970 | Gallagher et al. | 164/249 X |
| 3,586,559 | 6/1971 | Shepard | 156/158 |
| 3,600,202 | 8/1971 | Macleod | 106/38.8 X |
| 3,655,414 | 4/1972 | Hoffman et al. | 106/38.8 |
| 3,663,326 | 5/1972 | Wanesky | 156/155 X |
| 3,717,485 | 2/1973 | Larson | 106/38.8 |
| 3,801,335 | 4/1974 | Larson | 106/38.8 |
| 3,886,846 | 6/1975 | Bodine | 409/132 |
| 3,921,343 | 11/1975 | Speyer | 51/323 |
| 4,005,635 | 2/1977 | Feldcamp | 409/132 |

FOREIGN PATENT DOCUMENTS

| | | | |
|---|---|---|---|
| 1300199 | 7/1969 | Fed. Rep. of Germany | 164/45 |
| 8001865 | 7/1980 | Netherlands | 409/219 |

OTHER PUBLICATIONS

"Prototype Patterns for Investment Casting," by Timothy L. Coghill, Precision Metal/Jun. 1979.
Product Data Sheets: Chevron 150; Bareco 185; Elvax 420; Allied 8; Epolene C-10.

Primary Examiner—William R. Briggs
Assistant Examiner—Glenn L. Webb
Attorney, Agent, or Firm—Fay & Sharpe

[57] ABSTRACT

A block of machinable wax (B) is anchored to a fastening plate (A) with a layer of adhesive (20) in one embodiment and with wax machine screws (30, 32, 34) in another embodiment. The fastening plate and machinable wax block are adapted to be used in machine tools, such as numerical controlled apparatus for producing patterns and prototypes. The block of wax has a composition which includes 5 to 15 percent by volume paraffin wax with a melting point of 150° F. to 152° F.; 5 to 15 percent by volume microcrystalline wax having a melting point of substantially 190° F. to 192° F.; 5 to 10 percent by volume ethylene/vinyl acetate copolymer having a melting point of substantially 210° F.; 25–35 percent by volume nonemulsifiable polyethylene wax having a melting point of substantially 240° F.; 40 to 50 percent by volume nonemulsifiable polyethylene wax having a melting point of substantially 220° F.; and sufficient blue oil dye to impart a dark blue color to the wax block.

13 Claims, 4 Drawing Figures

MACHINABLE WAX FOR PROTOTYPE PATTERNS

BACKGROUND OF THE INVENTION

This invention pertains to the art of pattern machining. The invention finds particular application in conjunction with automated machine tools, such as numerical control and computer numerical control machining apparatus and will be described with particular reference thereto. It is to be appreciated, however, that the invention is also applicable for use in hand machining operations, investment pattern machining, prototype machining, and the like.

Heretofore, to initiate the production of a new product on the numerical control machine, the machine was programmed to perform a preselected series of machining steps or movements. After the initial programming of the numerical control machine, an aluminum or steel block was machined in accordance with the program to manufacture a first prototype or pattern. Commonly, several such prototypes were manufactured. The prototypes were carefully examined and measured to ascertain whether or not the prototypes were in compliance with the specifications of the product for which the machine had been programmed. If the prototypes failed to meet the specifications, the program was adjusted accordingly and additional prototypes machined. This process was repeated until satisfactory prototypes within the product specifications were consistently achieved.

One problem encountered in this process is wear from the ferrous and non-ferrous metals during machining of the prototypes. The ferrous and non-ferrous blocks are relatively hard and tend to wear or dull the cutting surfaces of the machine tool.

Another problem with the ferrous and non-ferrous blocks is that they are relatively expensive. Further, once used to machine a prototype, the blocks and removed chips are scrapped and not readily resusable.

Another problem in using metal blocks is that machining the prototype or pattern is relatively slow. Frequently, coolants must be applied adjacent the cutting edges of the machine tool to prevent an excessive heat buildup.

In accordance with the present invention, there is provided a new and improved material for use in machining patterns and prototypes and a new and improved method of machining patterns and prototypes using the new material.

SUMMARY OF THE INVENTION

In accordance with a first aspect of the present invention, there is provided a method of machining patterns. A block of machinable wax is formed and anchored to a metal fastening plate. The fastening plate with the attached wax block is mounted in a machine tool which machines the wax block to form the pattern.

In accordance with another aspect of the invention, there is provided a new and improved wax material which is ideally suited for machining. The material comprises 5 to 15 percent paraffin wax, 5 to 15 percent microcrystalline wax, 5 to 10 percent ethylene/vinyl acetate copolymer, and 65 to 85 percent nonemulsifiable polyethylene wax.

In accordance with yet another aspect of the invention, there is provided an assembly for machining patterns. A block of machinable wax has a plurality of threaded bores disposed in axial alignment with the fastening plate apertures. A plurality of machinable wax threaded fasteners extend through the fastening plate apertures and are received in the wax block bores.

A first advantage of the present invention is that it reduces machine tool wear.

Another advantage of the present invention is that it can be machined faster than metals because it is nonabrasive. The use of coolants during the machining operations are normally unnecessary.

Another advantage of the present invention is that it is less expensive than metal blocks. Further, old prototypes, scrap, and chips are readily melted, cast, and reused.

Still further advantages of the present invention include that the material is lighter than aluminum, it holds machine tolerances to plus or minus 0.001 inches, and other advantages which will become apparent upon reading and understanding the followed detailed description.

BRIEF DESCRIPTION OF THE DRAWINGS

The invention may take form in various parts and arrangements of parts, or in various steps and arrangements of steps. The drawings are only for the purpose of illustrating a preferred embodiment of the invention and are not to be construed as limiting the invention.

DETAILED DESCRIPTION OF THE PREFERRED AND ALTERNATE EMBODIMENT

Figure 1:
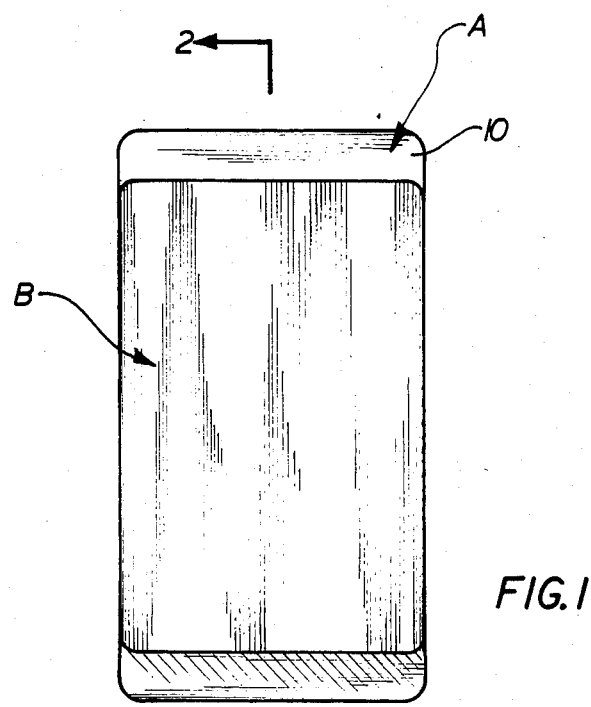
FIG. 1 is a plan view of the wax block anchored to a fastening plate in accordance with the present invention.
Figure 2:
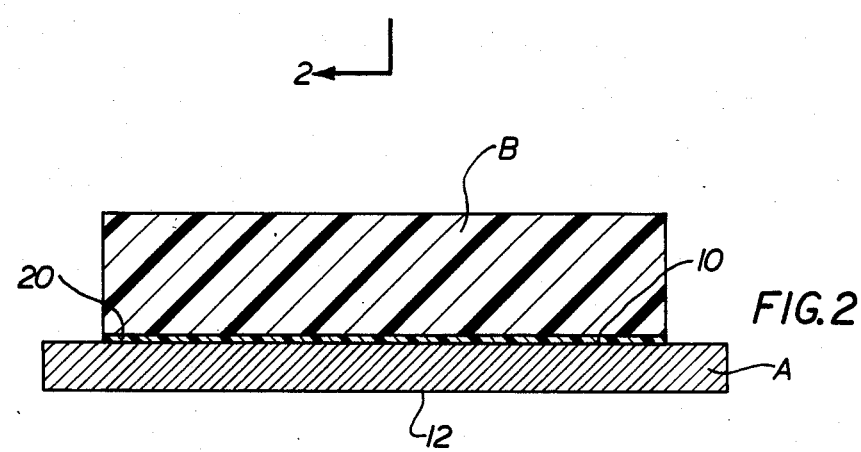
FIG. 2 is a sectional view through section 2—2 of FIG. 1.

With particular reference to FIGS. 1 and 2, there is provided a fastening plate A which is suitably configured to be received in a numerical control machine in a secure and predetermined relationship. A block of machinable wax B is securely anchored to the fastening plate.

The fastening plate A has a smooth planar upper surface 10 for receiving the wax block and a generally planar lower surface 12. An anchoring means such as a layer of adhesive 20 anchors the wax block to the fastening plate. A suitable wax adhesive is "Covinax 165 UFP" which is a product of Franklin Chemical Industries.

The machinable wax block B is illustrated as a generally rectangular prism although other shapes such as slabs and cylinders are also possible. The block is cast or machined to have a 25 microinch finish on the side toward the aluminum fastening plate to provide close surface to surface contact for stronger bonding. The wax block is very hard having in the preferred embodiment, a 0.5 dmm hardness, i.e. 0.05 mm penetration with a 100 g. weight. To avoid softening during machining, the wax has a relatively high melting point, in the preferred embodiment 225° F. or higher. Further, the wax has relatively great dimensional stability having, in the preferred embodiment, a volumetric expansion from room temperature to 160° F. of 5.5 percent or less. The wax has a specific gravity of 0.92 which is about 3 times lighter than aluminum. The wax block has a dark pigmentation to facilitate visual observation of the detailing and machined features. Preferably, the wax is dark blue.

The wax comprises 5-15 percent by volume a paraffin wax having a melting point of substantially 150° to 152° F.; 5-15 percent by volume a microcrystalline wax having a melting point of substantially 190° to 192° F.; 5-10 percent by volume ethyelen/vinyl acetate copolymer having a melting point of substantially 210° F.; 25-35 percent by volume nonemulsifiable polyethylene wax having a melting point of substantially 240° F.; and 40 to 50 percent by volume a nonemulsifiable polyethylene wax having a melting point of substantially 220° F.

The paraffin wax lowers the viscosity and the melting point to facilitate forming the blocks. The paraffin wax has the following physical properties: 151° F. melting point, AMP (ASTM D87); 1.432 refractive index at 80° C. (ASTM D1747); +30 color, saybolt (melted) (ASTM D87); substantially 0% moisture (ASTM D95); less than 0.5 percent by weight oil content (ASTM D721); 10 dmm penetration at 77° F. (ASTM D1321); 18 dmm penetration at 100° F.; 47 SUS viscosity at 180° F. (ASTM D2161); 42 SUS viscosity at 210° F.; 11 g/ln. sealing strength (ASTM D2005); 121° F. blocking temperature (ASTM 1465); 0.925 specific gravity at 73° F.; 0.775 specific gravity at 180° F.; 0.765 specific gravity at 210° F.; 6.45 pounds per gallon at 80° F.; and 6.35 pounds per gallon at 210° F. In the preferred embodiment, the paraffin wax is "Chevron 150" and is present at 10 percent by volume.

The microcrystalline wax reduces friction, improves gloss and blocking point, acts as a lubricant, and aids processing. The microcrystalline wax has the following physical characteristics: 192° F. melting point (ASTM D127); 184° F. congeling point (ASTM D938); 0.9422 g/cc density at 75° F. (ASTM D1168); 0.7630 g/cc density at 210° F.; 74 SUS viscosity at 210° F. (ASTM D88); 14.0 c. Sts. viscosity at 210° F. (ASTM D445); 9 dmm penetration at 77° F. (ASTM D1321); 66 dmm penetration at 130° F.; and 0.5+color (ASTM D-1500). In the preferred embodiment, the microcrystalline wax is Petrolite "Bareco Be Square 185" and is present at 10 percent by volume.

The ethylene/vinyl acetate copolymer improves gloss retention, improves blocking resistance, improves paraffin wax compatibility, improves bond strength at elevated temperatures, and raises the melting index while lowering the melting viscosity. The ethylene/vinyl acetate copolymer resin has the following physical properties: 18 percent by weight vinyl acetate content; 0.54 inherent viscosity at 30° C. (0.25 g/100 ml Toluene); 150 g./10 min. melt index (ASTM D1321, modified); 750 ppm BHT antioxidant; less than 0.3 percent by weight residual monomer; 850 psi tensile strength (ASTM D882); 550 percent elongation at break (ASTM D882); 2750 psi elastic (tensile modulus) (ASTM D882); 0.937 g/cc density at 23° C. (ASTM D1505); 35 lb/cu ft. bulk density; 1.492 refractive index; 83 dmm, 10 sec. hardness, Shore A-2 (ASTM D1706); 210° F. softening point, ring and ball (ASTM E28); and 150° F. cloud point in paraffin wax. The ethylene/vinyl acetate copolymer, in the preferred embodiment, is Dupont "Elvax 420" and is present at 5 percent by volume. The "Elvax 420" is a copolymer of polyethylene and vinyl acetate which is about 18 percent vinyl acetate.

The 240° F. melting point nonemulsifiable polyethylene wax improves gloss, release, blocking resistance, color dispersion in injection molding, hardness and abrasion resistance. The 240° F. melting point nonemulsifiable polyethylene has the following physical characteristics: 240° F. softening point; 1.0 dmm hardness; 0.93 g/cc density at B 75° F.; 350 cps viscosity at 284° F. In the preferred embodiment, the 240° F. melting point nonemulsifiable polyethylene is Allied 8 and is present at 30 percent by volume.

The 220° F. melting point nonemulsifiable polyethylene wax has a relatively high hardness, although not as hard as a higher melting point nonemulsifiable polyethylene wax. Further, it exhibits high gloss, low moisture transmission rates, good grease resistance, and good heat sealability. It imparts great flexibility and good gloss retention and scuff resistance to the resultant product. The 220° F. melting point nonemulsifiable polyethylene wax has the following physical characteristics: 104° C. ring and ball softening point; 4 dmm penetration hardness (100 g/5 sec/25° C.); 0.906 g/cc density at 25° C.; 9400 cp Brookfield viscosity at 302° F.; 1 Gardner scale color; a molecular weight of approximately 8000; and a melt index at 190° C. of 2250. In the preferred embodiment, the 220° F. melting point nonemulsifiable polyethylene wax is Eastman "Epolene C-10" and is present in 45 percent by volume.

In the preferred embodiment, BASF Oil Blue II dye is added at the rate of 7 grams per 100 pounds to impart a dark blue color to the resultant product.

Figure 3:
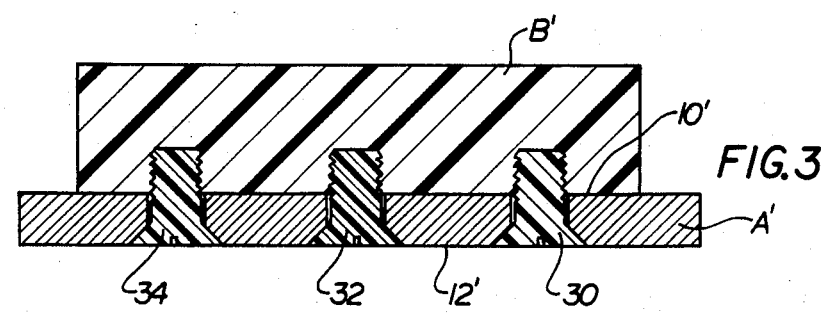
FIG. 3 is an alternate embodiment of a wax block anchored to a fastening plate in accordance with the present invention; and, FIG. 4 illustrates a wax block and mounting plate disposed in a numerical control machine.

With reference to FIG. 3, an alternate embodiment of a fastening plate A' with a wax block B' anchored thereto is illustrated. In the embodiment of FIG. 3, like parts with the embodiment of FIGS. 1 and 2 are illustrated with like reference numerals but followed by a prime ('). The fastening plate A' has a smooth polished upper surface 10' and a flat lower surface 12'. The fastening plate A includes a plurality of apertures therethrough for receiving a plurality of wax mechanical fasteners including wax machine screws 30, 32, and 34. The machine screws which are cast or machined of the same wax as the wax block B' extend through the fastening plate apertures and are received in threaded bores in the wax block. Other wax mechanical fasteners which provided threaded, bayonet-type, or the like interconnection with the block are also possible. Because the wax fasteners 30, 32, and 34 are constructed by the same wax material as the block B, the cutting tool can cut through the screws as easily as through the block and without damage.

Figure 4:
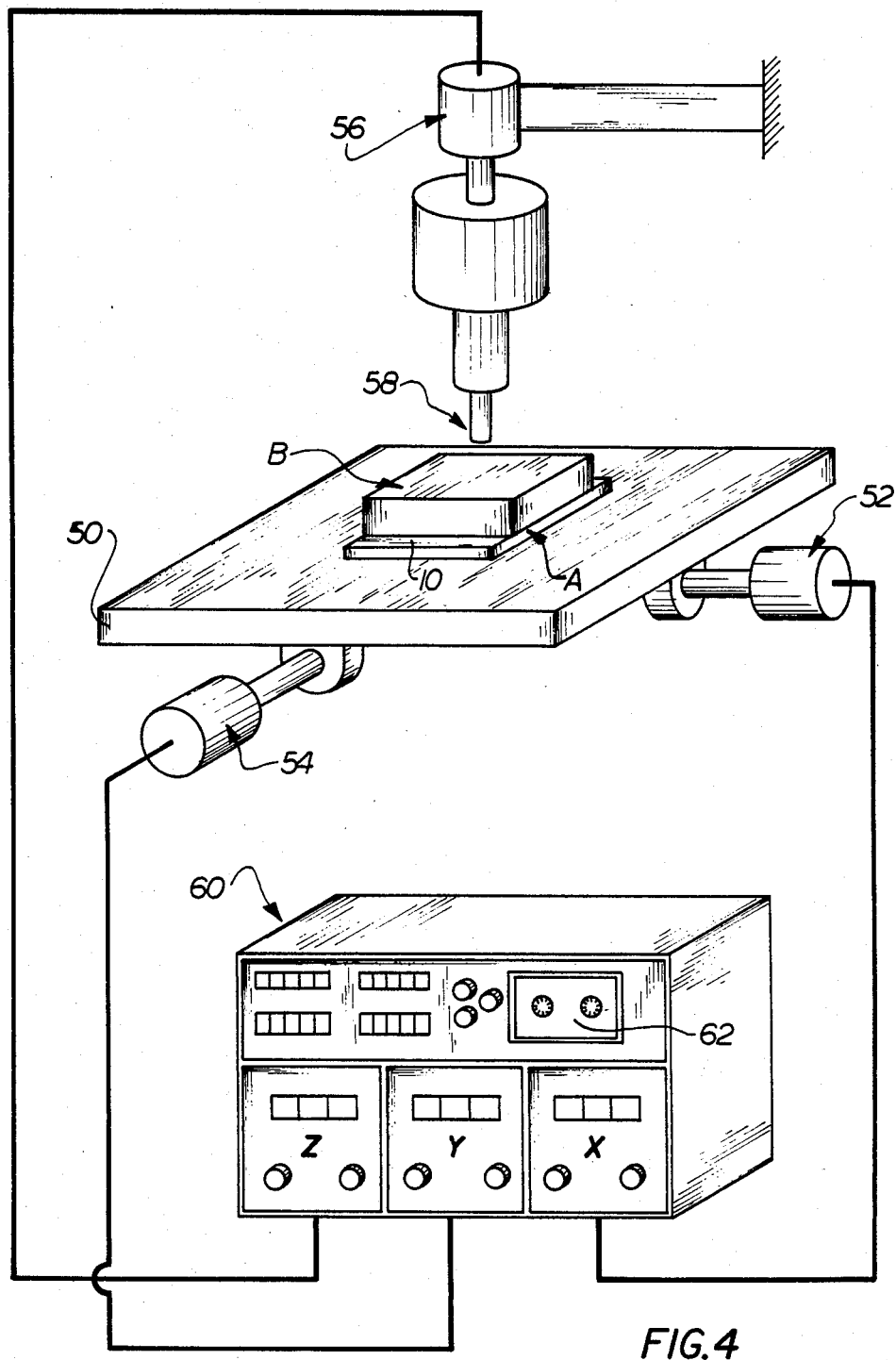

In use, the block B is injection molded or cast. When the block has cooled, a layer of the adhesive 20 is applied to one side and it is anchored to the fastening plate. In the alternate embodiment, a plurality of threaded bores are cut or molded into the lower surface of the block and the wax screws anchor the block to the fastening plate. With reference to FIG. 4, the fastening plate and lugs are received on a table 50 of a numerical controlled machine. The machine includes an X moving means 52 for selectively moving the table in an X direction and a Y moving means 54 for selectively moving the table in a Y direction. A Z moving means 56 is provided for selectively moving a cutting tool 58 in a Z direction. A computerized numerical controller 60 controls the X, Y, and Z moving means. The computer numerical control includes a memory means 62 such as a tape reader, floppy disk reader, programmable memory, or the like. The numerical controller reads a plurality of machine commands from the memory and causes the X, Y, and Z moving means to move the table and cutting tool through a preselected series of movements to machine a pattern. After the pattern is machined, the chips and any spoiled stock can be collected and remelted to form new blocks. The machined wax pattern is measured, inspected, or otherwise put to use. After its useful life has expired, the pattern may also be remelted and used to produce new blocks.

The invention has been described with reference to the preferred and alternate embodiment. Obviously, modifications and alterations will occur to others upon reading and understanding the preceding detailed description of the preferred and alternate embodiment. It is intended that the invention be construed as including all such alterations and modifications insofar as they come within the scope of the appended claims or the equivalents thereof.

Having thus described preferred and alternate embodiments, the invention is now claimed to be:

1. An assembly for machining patterns comprising:
   (a) a fastening plate which is shaped for mounting in a machine tool;
   (b) a block of machinable wax, the wax block comprising a mixture of:
      5 to 15 percent by volume paraffin wax having a melting point of substantially 150° F. to 152° F.,
      5 to 15 percent by volume microcrystalline wax,
      5 to 10 percent by volume ethylene/vinyl acetate copolymer,
      40 to 50 percent by volume nonemulsifiable polyethylene wax having a melting point of substantially 220° F., a hardness of generally 4 dmm., and a Brookfield viscosity at 302° F. of about 9400 cps,
      25 to 35 percent by volume nonemulsifiable polyethylene wax having a melting point of substantially 240° F., a hardness of generally 1 dmm., and a viscosity at 284° F. of about 350 cps; and,
   (c) anchoring means for anchoring the machinable wax block to the fastening plate.

2. The assembly as set forth in claim 1 wherein the ethylene/vinyl acetate copolymer is substantially 18 percent vinyl acetate.

3. The assembly as set forth in claim 1 wherein the paraffin wax is substantially 10 percent by volume of the wax block, the microcrystalline wax is substantially 10 percent by volume of the wax block, and the ethylene/vinyl acetate copolymer is substantially 5 percent by volume of the wax block.

4. The assembly as set forth in claim 3 wherein the nonemulsifiable polyethylene wax having the 240° F. melting point is substantially 30 percent by volume of the wax block and the nonemulsifiable polyethylene wax having the 220° F. melting point is substantially 45 percent by volume of the wax block.

5. The assembly as set forth in claim 4 wherein the wax block further includes a dark colored oil base dye.

6. The assembly as set forth in claim 5 wherein the dye is blue.

7. The assembly as set forth in claim 1 further including a layer of adhesive disposed between the wax block and the fastening plate to anchor them together.

8. An assembly for machining prototype patterns with tolerances in the range of 0.001 inches or better, the assembly comprising:
   (a) holding means for stably holding a wax block during a machining operation;
   (b) anchoring means for anchoring the wax block to the holding means; and,
   (c) the wax block comprising a mixture of:
      (i) 40–50 percent nonemulsifiable polyethylene wax having a melting point of about 220° F.;
      (ii) 24–35 percent nonemulsifiable polyethylene wax having a melting point of at least 230° F.;
      (iii) 10–30 percent hydrocarbon wax including paraffin, microcrystalline wax, and mixtures thereof; and,
      (iv) 5–10 percent resin which improves compatibility between the hydrocarbon wax and the polyethylene waxes.

9. An assembly for machinin prototype patterns with tolerances in the range of 0.001 inches or better, the assembly comprising:
   (a) holding means for stably holding a wax block during a machining operation;
   (b) anchoring means for anchoring the wax block to the holding means; and,
   (c) the wax block comprising a mixture of:
      (i) 50–85 percent nonemulsifiable polyethylene wax having a density of 0.90–0.94 grams per cubic centimeter at 77° F.;
      (ii) at least 5 percent hydrocarbon wax which lowers the melting point of the mixture and acts as a lubricant; and,
      (iii) at least 5 percent synthetic resin which includes a vinyl acetate polymeric component to improve hydrocarbon wax compatibility.

10. The assembly as set forth in claim 9 wherein the hydrocarbon wax is a mixture of paraffin and microcrystaline wax.

11. The assembly as set forth in claim 9 wherein the synthetic resin is about 18 percent vinyl acetate.

12. The assembly as set forth in claim 9 wherein the wax block has a dark blue pigmentation to facilitate visual examination of machined surfaces.

13. The assembly as set forth in claim 9 wherein the nonemulsifiable polyethylene wax comprises 25 to 35 percent by volume nonemulsifiable polyethylene wax with a hardness of substantially 1 dmm. and 40 to 50 percent by volume nonemulsifiable polyethylene wax having a hardness of generally 4 dmm.

* * * * *